United States Patent
Pearlstein et al.

(10) Patent No.: US 6,539,058 B1
(45) Date of Patent: Mar. 25, 2003

(54) METHODS AND APPARATUS FOR REDUCING DRIFT DUE TO AVERAGING IN REDUCED RESOLUTION VIDEO DECODERS

(75) Inventors: Larry Pearlstein, Newton, PA (US); Frank A. Lane, Medford Lakes, NJ (US); Sharif M. Sazzad, Monmouth Junction, NJ (US)

(73) Assignee: Hitachi America, Ltd., Tarrytown, NY (US)

( * ) Notice: Subject to any disclaimer, the term of this patent is extended or adjusted under 35 U.S.C. 154(b) by 0 days.

(21) Appl. No.: 09/059,069

(22) Filed: Apr. 13, 1998

(51) Int. Cl.$^7$ .................................................. H04N 7/12
(52) U.S. Cl. .............................. 375/240.25; 375/240.25
(58) Field of Search ....................... 375/240.12, 240.15, 375/240.17, 240.21, 240.25; 348/324.1, 401.1, 402.1, 405.1, 407.1; 382/232, 236, 238, 239, 250

(56) References Cited

U.S. PATENT DOCUMENTS 5,325,125 A * 6/1994 Naimpally et al. .... 375/240.12
5,493,513 A * 2/1996 Keith et al. ................. 709/247

* cited by examiner

*Primary Examiner*—Nhon Diep
(74) *Attorney, Agent, or Firm*—Straub & Pokotylo; Michael P. Straub (57) ABSTRACT

Methods and apparatus for simulating, in reduced resolution video decoders, the biasing effect associated with MPEG's specified rounding of pixel values including a fractional component of 0.5 to the next highest integer value are described. In one embodiment, the biasing effect is simulated by generating luminance and chrominance DC DCT coefficient bias values from, e.g., motion vector offset data. The DC DCT bias values are then added to the DC DCT coefficients of the luminance and chrominance blocks, respectively, which correspond to the same image block to which the motion vector data used to generate the bias values corresponds. In another embodiment, pixel values are directly adjusted to simulate the biasing effect associated with MPEG compliant rounding. In such an embodiment, luminance and chrominance pixel biasing values are generated as a function of, e.g., motion vector offset information. The bias values are added to the pixel values generated through the use of motion compensated prediction. The pixel values are then rounded by performing a non-biased rounding operation to generate integer pixel values.

25 Claims, 8 Drawing Sheets

| (P00+P01)/2 | (P01+P02)/2 | (P02+P03)/2 | ... | (P07+P08)/2 |
|---|---|---|---|---|
| (P10+P11)/2 | (P11+P12)/2 | (P12+P13)/2 | ... | (P17+P18)/2 |
| (P20+P21)/2 | (P21+P22)/2 | (P22+P23)/2 | ... | (P27+P28)/2 |
| . | . | . | . | . |
| . | . | . | . | . |
| (P70+P71)/2 | (P71+P72)/2 | (P72+P73)/2 | ... | (P77+P78)/2 |

Fig. 3

| | | | | |
|---|---|---|---|---|
| (P00+P10)/2 | (P01+P11)/2 | (P02+P12)/2 | ... | (P07+P17)/2 |
| (P10+P20)/2 | (P11+P21)/2 | (P12+P22)/2 | ... | (P17+P27)/2 |
| (P20+P30)/2 | (P21+P31)/2 | (P22+P32)/2 | ... | (P27+P37)/2 |
| ⋮ | ⋮ | ⋮ | ⋮ | ⋮ |
| (P70+P80)/2 | (P71+P81)/2 | (P72+P82)/2 | ... | (P77+P87)/2 |

Fig. 4 
400

| | | | | |
|---|---|---|---|---|
| (P00+P01+P10+P11)/4 | (P01+P02+P11+P12)/4 | (P02+P03+P12+P13)/4 | ... | (P07+P08+P17+P18)/4 |
| (P10+P11+P20+P21)/4 | (P11+P12+P21+P22)/4 | (P12+P13+P22+P23)/4 | ... | (P17+P18+P27+P28)/4 |
| (P20+P21+P30+P31)/4 | (P21+P22+P31+P32)/4 | (P22+P23+P32+P33)/4 | ... | (P27+P28+P37+P38)/4 |
| ⋮ | ⋮ | ⋮ | ⋮ | ⋮ |
| (P70+P71+P80+P81)/4 | (P71+P72+P81+P82)/4 | (P72+P73+P82+P83)/4 | ... | (P77+P78+P87+P88)/4 |

Fig. 5

| MOTION OFFSET CHARACTERISTICS | PER-PIXEL BIAS |
| --- | --- |
| INTEGER VERTICAL AND HORIZONTAL | 0 |
| HALF-PEL HORIZONTAL & INTEGER VERTICAL | 0.25 |
| INTEGER HORIZONTAL & HALF-PEL VERTICAL | 0.25 |
| HALF-PEL HORIZONTAL & HALF-PEL VERTICAL | 0.125 |

METHODS AND APPARATUS FOR REDUCING DRIFT DUE TO AVERAGING IN REDUCED RESOLUTION VIDEO DECODERS

FIELD OF THE INVENTION

The present invention relates to methods and apparatus for reducing and/or eliminating drift in luminance and/or chrominance values that can occur in various known reduced resolution, e.g., downsampling, video decoders.

BACKGROUND OF THE INVENTION

Various digital applications, such as digital video, involve the processing, storage, and transmission of relatively large amounts of digital data representing, e.g., one or more digital images. Each image normally comprises a large number of pixels. Each pixel is represented in digital form using one or more numerical values referred to herein as pixel values. A pixel value provides, e.g., luminance or chrominance information corresponding to a single pixel.

In order to reduce the amount of digital data that must be stored and transmitted in conjunction with digital applications, various digital coding techniques, e.g., transform encoding techniques, have been developed. Discrete cosine transform (DCT) encoding is a particularly common form of transform encoding. The data (pixel values) representing several pixels, e.g., an 8×8 block of pixels, is frequently encoded using DCT coding to generate a series of AC and DC DCT coefficient values. The DCT coefficient values represent the 8×8 block of pixels in encoded form.

DCT encoding is frequently used in combination with motion compensated prediction techniques which are used to further reduce the amount of data required to represent a series of digital images. Motion compensated prediction involves the coding of all or a portion of an image by referring to a portion of one or more other images, e.g., reference frames. Motion vectors are used when encoding images via reference to other frame(s). A motion vector identifies pixels of a reference frame to be used when making a motion compensated prediction to reconstruct an image. The pixels to be used are identified in a motion vector through the use of horizontal and vertical offsets which are interpreted relative to the location of a macroblock that is being decoded.

One standard proposed for the coding of motion pictures, commonly referred to as the MPEG-2 standard, described in ISO/IEC 13818-2 (1996) Generic Coding of Moving Picture and Associated Audio Information: Video (hereinafter referred to as the "MPEG-2" reference), relies heavily on the use of DCT and motion compensated prediction coding techniques. An earlier version of MPEG, referred to as MPEG-1 also supports the use of motion compensated prediction.

In accordance with MPEG-2 images, e.g., frames, can be coded as intra-coded (I) frames, predictively coded (P) frames, or bi-directional coded (B) frames. I frames are encoded without the use of motion compensation. P frames are encoded using motion compensation and a reference to a single anchor frame. The single anchor frame is a preceeding frame in the sequence of frames being decoded. B frames are encoded using a reference to two anchor frames, e.g., a preceding frame and a subsequent frame. Reference to the subsequent frame is achieved using a backward motion vector while reference to the preceding frame is achieved using a forward motion vector. In MPEG, I and P frames may be used as anchor frames for prediction purposes. B frames are not used as anchor frames.

MPEG-1 and MPEG-2 both support the specification of motion vector information, i.e., vertical and horizontal offsets, in half-pixel (half-pel) units. These standards specify that bilinear interpolation, which involves a division operation, is to be used when determining predicted pixel values when non-integer offsets are specified. These standards also specify that chrominance motion vector values are to be obtained by scaling transmitted luminance motion vector values.

As will be discussed in detail below, the MPEG standards specify that the result of the division operation performed as part of a prediction should be rounded to the nearest integer. The MPEG standards further specify that when the result of the division operation has a fractional part of one half, the result is to be rounded away from zero. Since the quantities involved in prediction calculations are non-negative, this results in rounding a fractional part of one half up to the next highest integer. The specified rounding up results in an intentional biasing of pixel values.

As a result of MPEG's integer rounding procedure compliant motion compensated prediction modules normally generate integer pixel values as their output. In addition, pixel values generated by performing an inverse discrete cosine operation are normally output as integer values. This simplifies subsequent processing by eliminating the need to handle fractional values.

MPEG encoders are designed with the expectation that data generated by MPEG encoders will be decoded in accordance with the above discussed MPEG specified integer rounding operation being performed at decoding time. Because of the predictable nature of the rounding operation, MPEG encoders can encode data in such a manner that, when all the encoded data is decoded by a fully compliant MPEG decoder, the rounding that occurs over multiple sequential predictions will not cause unanticipated changes in brightness or color sometimes referred to as drift.

Various approaches have been taken to implement low cost video decoders capable of decoding and displaying digital video data. Many of these approaches involve one or more data reduction operations, e.g., downsampling, designed to reduce the amount of encoded video data that must be stored and processed by a video decoder. A video decoder which performs downsampling is referred to as a "downsampling" video decoder. Because such decoders produce reduced resolution images, they are also sometimes referred to as "reduced resolution" decoders. Downsampling video decoders are discussed in U.S. Pat. No. 5,635,985 which is hereby expressly incorporated by reference.

Figure 1:
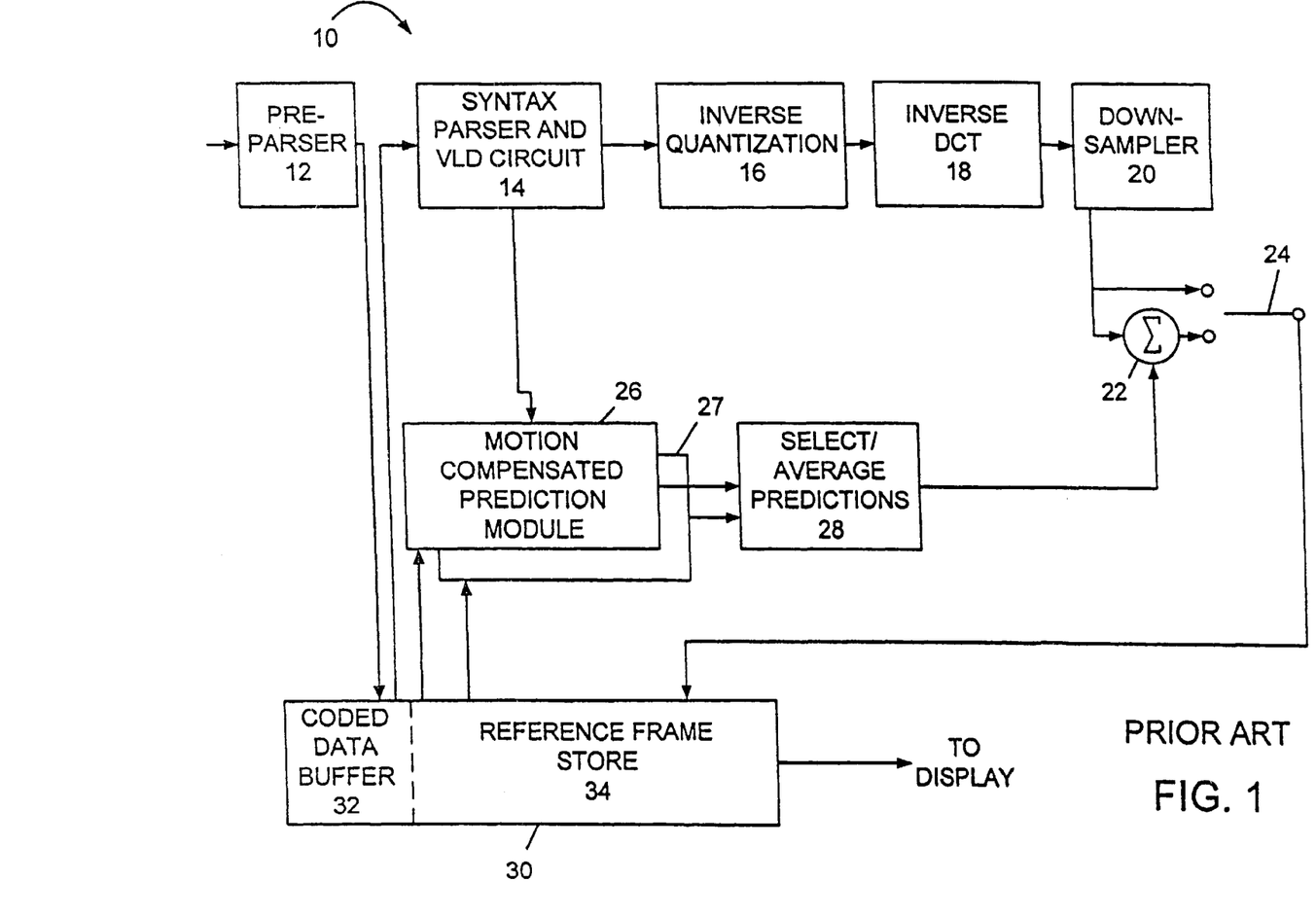
FIG. 1 a known downsampling video decoder.

FIG. 1 illustrates a known downsampling video decoder 10. The decoder 10 includes preparser 12, a syntax parser and variable length decoding (VLD) circuit 14, an inverse quantization circuit 16, an inverse discrete cosine transform (IDCT) circuit 18, a downsampler 20, summer 22, switch 24, memory 30, a pair of motion compensated prediction modules 26, 27 and a select/average predictions circuit 28. The memory 30 includes a coded data buffer 32 and a reference frame store 34. The various components of the decoder 10 are coupled together as illustrated in FIG. 1.

The preparser 12 receives encoded video data and selectively discards portions of the received data prior to storage in the coded data buffer 32. The encoded data from the buffer 32 is supplied to the input of the syntax parser and VLD circuit 14. The circuit 14 provides motion data and other motion prediction information to the motion compensated prediction modules 26, 27. In addition, it parses and variable length decodes the received data. A data output of the syntax parser and VLD circuit 14 is coupled to an input of the inverse quantization circuit 16.

The inverse quantization circuit 16 generates a series of DCT coefficients which are supplied to the IDCT circuit 18. From the received DCT coefficients, the IDCT circuit 18 generates a plurality of integer pixel values. In the case of intra-coded images, e.g., I frames, these values fully represent the image being decoded. In the case of inter-coded images, e.g., P and B frames, the output of the IDCT circuit 18 represents image (difference) data which is to be combined with additional image data to form a complete representation of the image or image portion being decoded. The additional image data, with which the output of the IDCT circuit is to be combined, is generated through the use of one or more received motion vectors and stored reference frames. The reference frames are obtained by the MCP modules 26, 27 from the reference frame store 34.

In order to reduce the amount of decoded video data that must be stored in the memory 30, the downsampler 20 is used. In the case of inter-coded data, the downsampled video data output by the downsampler 20 is stored, via switch 24, in the reference frame store 34.

Motion compensated prediction modules 26 and 27 receive motion vector data from the syntax parser and VLD circuit 14 and downsampled anchor frames from the reference frame store 34. Using these inputs, they perform motion compensated prediction operations. The motion compensated prediction modules 26, 27 generate integer pixel values representing a portion of the image being decoded.

In the case of uni-directional motion compensation, the output of one of modules 26, 27 is selected by the select/average predictions circuit 28 and supplied to the summer 22. In the case of bi-directional motion compensation the values output by the modules 26 and 27 are averaged by the average predictions circuit 28. The circuit 28 rounds the result of the averaging process into integer values in accordance with the MPEG specified rounding procedure. The integer values generated by the circuit 28 are supplied to the input of the summer 22.

In the case of inter-coded video data, the summer 22 is used to combine the output of the downsampler 20, with the output of the select/average predictions circuit 28. The resulting data which represents a decoded inter-coded video frame is stored, via switch 24, in the reference frame store 34.

The decoder 10 outputs the decoded video frames stored in the reference frame store 34 to be displayed on a display device. Because of the downsampling operation, the decoded video frames are of a lower resolution than the resolution at which the frames were originally encoded.

As a result of the data reduction operations performed by the downsampling decoder 10, the anchor frame data used in performing motion compensated predictions is considerably different than that which would have been used if the encoded video data were decoded and stored at full resolution for anchor frame purposes. Also, in general, the distribution of fractional values in a downsampling decoder resulting from motion compensated prediction are different from those that would result in a full resolution decoder. Because of these two factors, the effect of rounding the result of division operations performed during motion compensated predictions will be different than that which was contemplated at encoding time. This can result in drift in terms of pixel luminance and chrominance values from their intended values. The problem of drift increases as subsequent predictions are made from a predicted frame.

Accordingly, there is a need for methods and apparatus for reducing the amount of luminance and chrominance drift introduced into video images as the result of using reduced resolution decoding techniques such as downsampling. It is desirable that any new method and apparatus for reducing drift be relatively easy and inexpensive to implement. It is also desirable that at least some of the methods and apparatus be easy to incorporate with existing reduced resolution decoder designs.

SUMMARY OF THE PRESENT INVENTION

The present invention relates to methods and apparatus for reducing and/or eliminating drift in luminance and/or chrominance values that can occur in various known reduced resolution, e.g., downsampling, video decoders.

As discussed above, MPEG requires that pixel values generated through the use of motion compensated prediction be rounded up to the next largest integer value when a fractional part of 0.5 results. This may occur, e.g., when forward or backward predictions are made and rounded to generate integer pixel values. It may also occur when pixel values representing the result of forward or backward predictions are averaged and the result rounded to generate integer pixel values, e.g., in the case of bi-directionally coded frames.

The present invention simulates the upward biasing effect of the above discussed MPEG rounding technique in, e.g., downsampling video decoders.

In one embodiment, the biasing effect is simulated by generating luminance and chrominance DC DCT coefficient bias values from, e.g., motion vector offset data. The DC DCT bias values are then added to the DC DCT coefficients of the luminance and chrominance blocks, respectively, which correspond to the same image block to which the motion vector data used to generate the bias values correspond. In one such embodiment, an IDCT circuit outputs pixel values which include fractional components. These pixel values are combined with other pixel values, generated through the use of motion compensated predictions which may also include fractional components. The pixel values resulting from the combining operation are averaged to produce integer values using a non-biased rounding operation. The resulting integer pixel values represent a decoded image or portion thereof which may be, e.g., stored for use as a reference frame and/or displayed.

In another embodiment, pixel values are directly adjusted to simulate the biasing effect associated with MPEG compliant rounding. In such an embodiment, luminance and chrominance pixel biasing values are generated. The bias values are added to the luminance and chrominance pixel values, respectively, generated through the use of motion compensated prediction. The pixel values are then rounded to generate integer pixel values.

The methods and apparatus of the present invention can be used in a wide variety of applications including television receivers, video recorders, computers and a host of other devices which decode video data.

Numerous additional features and embodiments of the present invention are discussed below in the detailed description which follows.

DETAILED DESCRIPTION

As discussed above, the present invention is directed to methods and apparatus for reducing and or eliminating drift in luminance and/or chrominance values that can occur in various known reduced resolution, e.g., downsampling, video decoders. In various embodiments, the present invention simulates the pixel value biasing effect which occurs in motion compensated prediction modules and select/average prediction circuits which implement MPEG's specified integer rounding techniques.

In order to simulate the biasing effect of the MPEG rounding operation which occurs in fully MPEG compliant motion compensated prediction modules, an estimate of the biasing effect is important.

Figure 2:
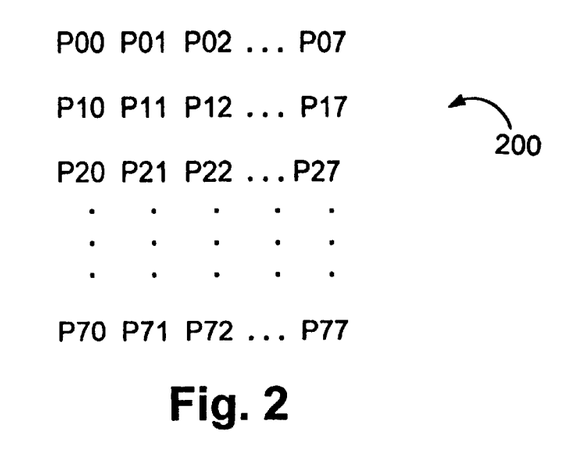
FIG. 2 illustrates a block of pixel values.

As discussed above, the MPEG standards for video coding, both MPEG-1 and MPEG-2, support the specification of motion information, e.g., vertical and horizontal offsets used in making motion compensated predictions, in half-pixel units. These standards specify the use of bilinear interpolation to determine predicted pixel values when non-integer offsets are specified. For purposes of explanation consider an 8 x 8 block of luminance pixel values 200 illustrated in FIG. 2. The block of pixel values 200 comprises eight rows and eight columns of pixel values. For purposes of explanation, each pixel value in FIG. 2 is represented by a P followed by a first number indicating the row in which the pixel value is located and a second number indicating the column in which the pixel value is located. For example P21 is used to indicate the pixel value in row 2, column 1 of the block 200.

In estimating the effect of rounding on motion predictions, various potential motion vector values need to be considered. Because half pel resolution is allowed, horizontal and vertical motion vector offsets may be specified as integers or non-integers where the non-integer would have 0.5 (a half-pel) as its fractional component. Accordingly, when considering the bias effect due to rounding of division results up from a 0.5 remainder the following four possible motion vector offsets cases must be considered:

| | Motion Vector | |
|---|---|---|
| | horizonatl offset | vertical offset |
| (1) | integer | integer |
| (2) | non-integer (X.5) | integer |
| (3) | integer | non-integer (X.5) |
| (4) | non-integer (X.5) | non-integer (X.5) |

Consider, as an example of case (1) a motion vector of (0,0) applied to the block of pixel values 200. In such a case, the resulting prediction would be the same as block 200.

Note that the use of integer horizontal and integer vertical motion vector offsets results in the selection of pixel values from the anchor frame or block without the need to perform a division operation. Accordingly, for case (1), there is no chance in a fully compliant MPEG decoder that a value of 0.5 could result and be rounded up as part of the prediction operation. Accordingly, for case (1) the MPEG requirement that pixel values of 0.5 be rounded up has no pixel value biasing effect.

Figure 3:
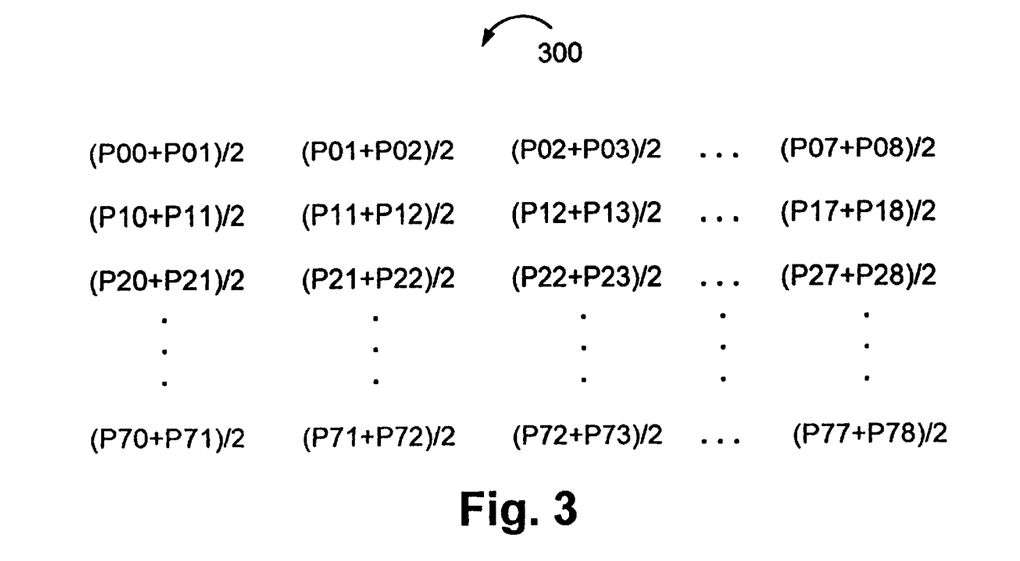
FIGS. 3, 4 and 5 illustrate blocks of pixel values generated through the use of motion compensated prediction.

In case (2) a motion vector has a non-integer (half-pel) horizontal offset and an integer vertical offset. The motion vector (0.5,0) is an example of this case. The block of pixel values 300 resulting from application of the motion vector (0.5,0) to block 200 is illustrated in FIG. 3. Note that each pixel value in case (2) is the result of dividing the sum of two integer pixel values by two. Assuming that the two integer pixel values, which contribute to each generated pixel value, have the same probability of being odd or even, there is a 50% chance that the result of any division operation will produce a fractional component of precisely 0.5. Thus, on average, for case (2), the MPEG requirement that pixel values of 0.5 be rounded up, will have a 0.25 pixel value biasing effect (0.5 chance of occurrence)×(0.5 increase in pixel value/occurrence).

Figure 4:
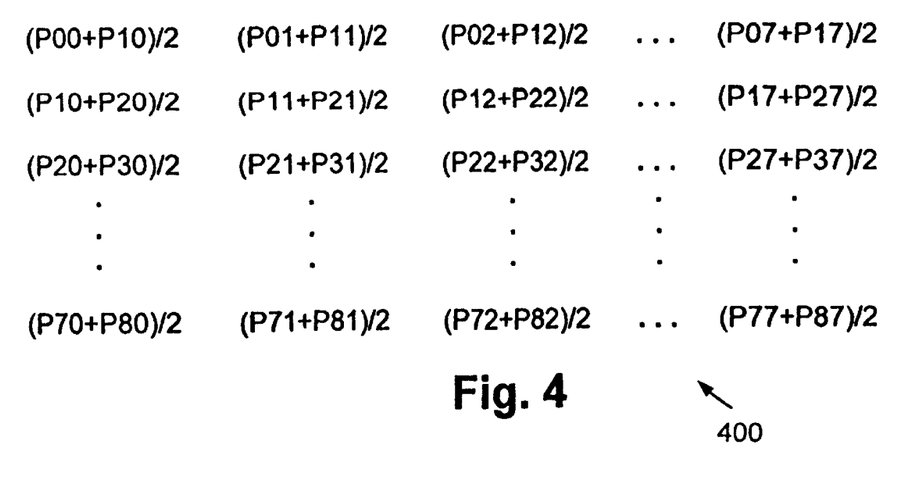

In case (3) a motion vector has an integer horizontal offset and a non-integer (half-pel) vertical offset. The motion vector (0, 0.5) is an example of this case. The block of pixel values 400 resulting from application of the motion vector (0, 0.5) to block 200 is illustrated in FIG. 4. Note that each pixel value in case (3) is the result of dividing the sum of two integer pixel values by two. Assuming that the two integer pixel values, which contribute to each generated pixel value, have the same probability of being odd or even, there is a 50% chance that the result of any division operation will produce a fractional component of precisely 0.5. Thus, on average, for case (3), the MPEG requirement that pixel values of 0.5 be rounded up, will have a 0.25 pixel value biasing effect (0.5 chance of occurrence)×(0.5 increase in pixel value/occurrence).

Figure 5:
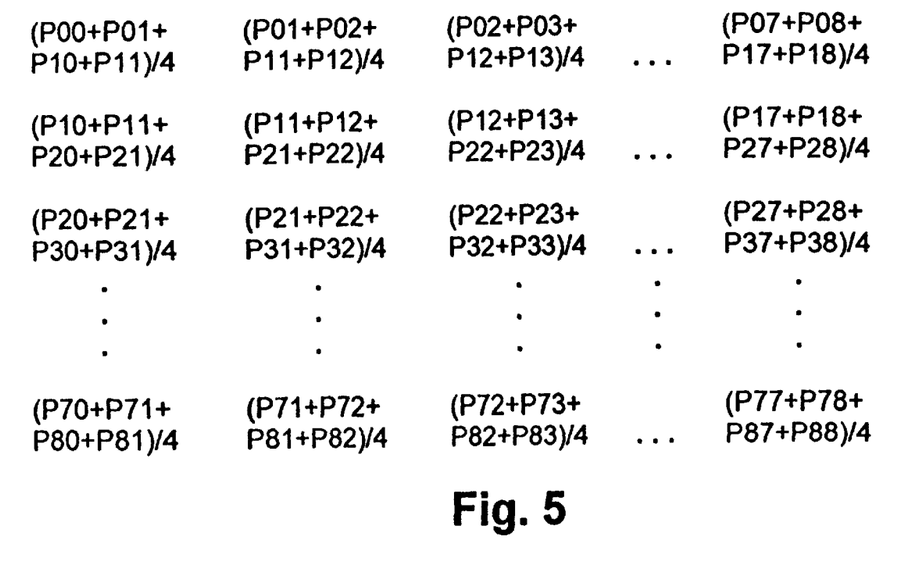

In case (4) a motion vector has a non-integer (half-pel) horizontal offset and a non-integer (half-pel) vertical offset. The motion vector (0.5, 0.5) is an example of this case. The block of pixels 500 resulting from application of the motion vector (0, 0.5) to block 200 is illustrated in FIG. 5. Note that each pixel value in case (4) is the result of dividing the sum of four integer pixel values by four. Assuming that the four integer pixel values, which contribute to each generated pixel value, have the same probability of being odd or even, there is a 25% chance that the result of a division operation will produce a fractional component of precisely 0.5. Thus, on average, for case (4), the MPEG requirement that pixel values of 0.5 be rounded up, will have a 0.125 pixel value biasing effect (0.25 chance of occurrence)×(0.5 increase in pixel value/occurrence).

Figure 6:
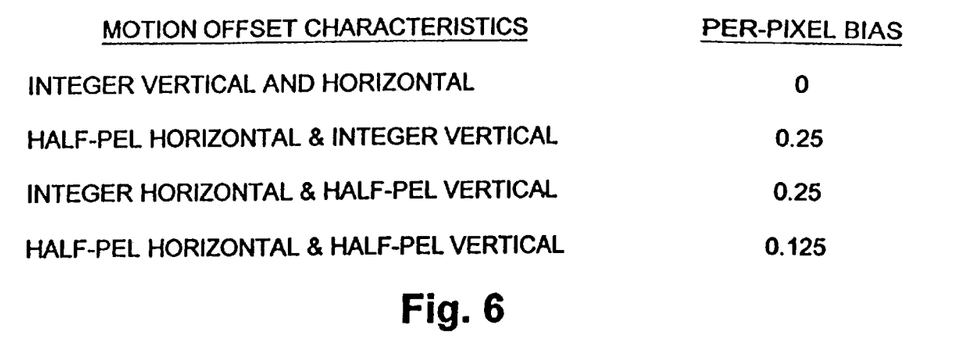
FIG. 6 is a table of average pixel bias values associated with the use of luminance motion vectors having the indicated offset characteristics.

The estimated average pixel biasing effect of the above discussed four motion vector cases is set forth in FIG. 6. As will be discussed below, in accordance with one embodiment of the present invention, a lookup table including the information of FIG. 6 is used in simulating the pixel value biasing effect which normally occurs in the motion compensated prediction module of a fully compliant MPEG decoder.

As discussed above, the known downsampling decoder 100 does not take into account the MPEG biasing effects set forth in FIG. 6. For this reason, the decoder 100 normally produces a slight average drift for each prediction of luminance and chrominance pixel values.

Various reduced resolution decoders implemented in accordance with the present invention simulate the pixel biasing effects set forth in the table of FIG. 6 by 1) adding a fractional offset to the DC DCT coefficient corresponding to the block of luminance or chrominance values which are being generated through the use of motion compensated prediction or 2) adding the bias as a fractional value to each pixel value just before performing a final rounding operation associated with performing a motion compensated prediction.

Figure 7:
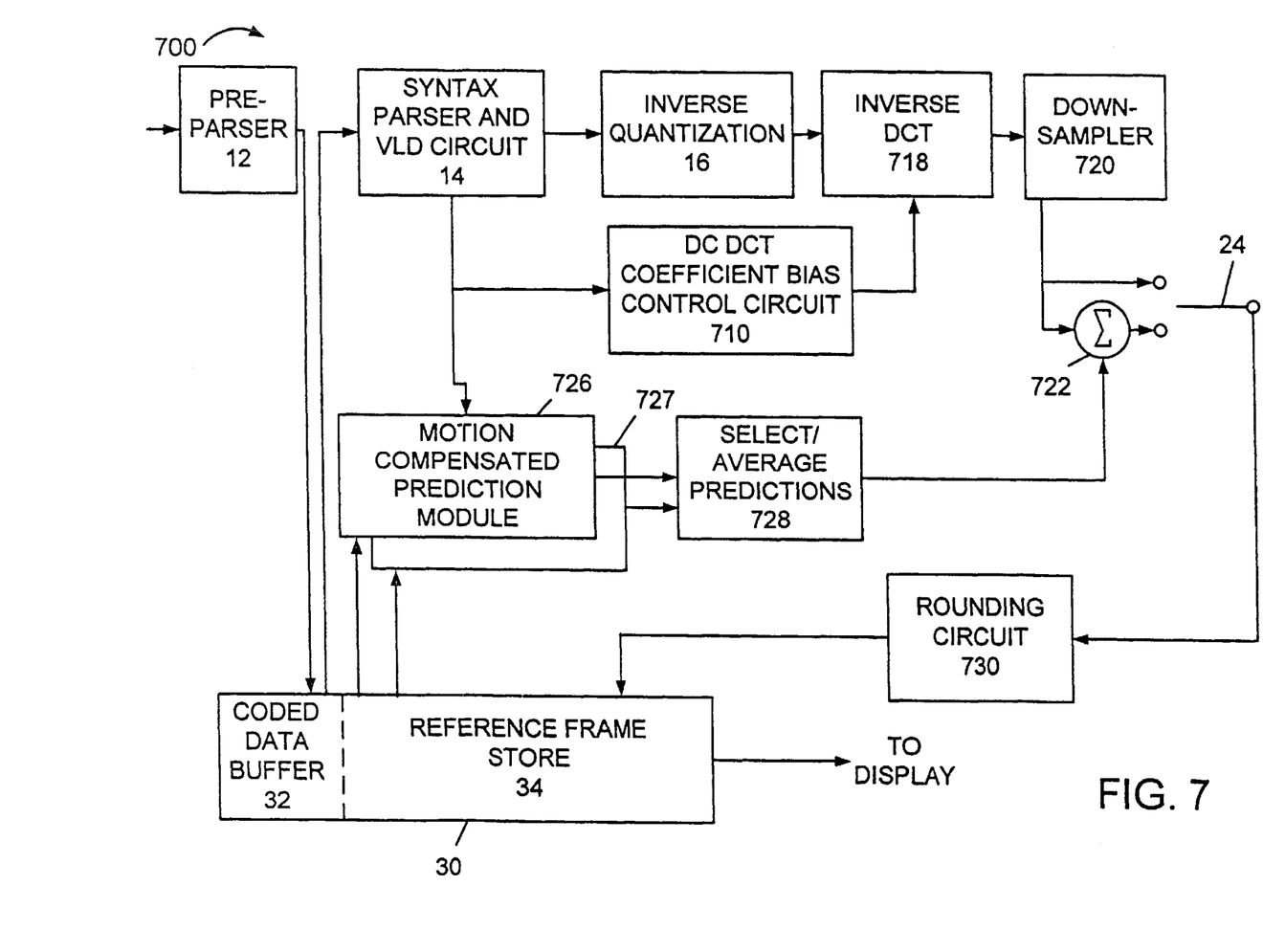
FIG. 7 is a diagram of a downsampling video decoder implemented in accordance with a first embodiment of the present invention.

Referring now to FIG. 7, there is illustrated a downsampling reduced resolution video decoder 700, implemented in accordance with one embodiment of the present invention. The decoder 700 includes may elements which are the same as or similar to those of the known decoder 100. Elements of the decoder 700 which may be implemented using the same or similar components to those of the decoder 100 are referred to using the same reference numerals. For the purpose of brevity these elements will not be described again in detail.

The decoder 700 includes an optional preparser 12, a memory 30, a syntax parser and VLD circuit 14, an inverse quantization circuit 16, an IDCT circuit 718, a downsampler 720, a switch 24, summer 722, a pair of motion compensated prediction (MCP) modules 726, 727, and a select/average predictions circuit 728. In addition to these elements which serve similar functions to those of the like named circuits of FIG. 1, the decoder 700 includes a DC DCT coefficient bias control circuit having an input coupled to the syntax parser and VLD circuit 14 and an output coupled to a biasing input of the IDCT circuit 718. The decoder 700 also includes a rounding circuit 730 for coupling the output of the switch 24 to the reference frame store 34. The components of the decoder 700 are coupled together as illustrated in FIG. 7.

The downsampler 720, MCP circuits 726, 727, select/average predictions circuit 728, and summer 722 differ from that of the known decoder 100, in that these circuits process and output values including fractional components. That is, they do not round their outputs to integer values as do known circuits of the decoder 100. The values generated and output by these circuits 720, 722, 726, 727, 728 may be, e.g., floating point values or values represented using fixed position, i.e., a fixed number of bits.

In the decoder circuit 700, motion vector and other motion compensated prediction related information, output by the syntax parser and VLD circuit 14, is supplied to the DC DCT coefficient bias control circuit 710, in addition to the first and second MCP modules 726, 727. The information supplied to the MCP modules 726, 727 and the CBC circuit 710 may include: frame type information; current macroblock position information, macroblock type, macroblock position information and motion vector information (including horizontal and vertical motion vector offsets). In most embodiments the CBC circuit uses only a small portion of the information output by the VLD circuit 14. For example, the information utilized by the CBC circuit 710 may be limited to motion vector offset information.

The CBC circuit 710 is responsible for generating bias values to be added to the DC DCT coefficients of luminance and chrominance blocks being generated through the use of motion compensated prediction. The operation of the CBC circuit 710 will be described in regard to generation of a luminance DC DCT coefficient bias value (LBV) to be used with luminance blocks.

In accordance with MPEG, luminance motion vector values are scaled to produce chrominance motion vector values. It is to be understood that a chrominance DC DCT coefficient bias value (CBV), to be used with chrominance blocks, can be generated by the CBC circuit 710 using the same techniques described with regard to the generation of LBV values using motion vector values which have been scaled for use with chrominance blocks.

The IDCT circuit 718 receives as its inputs, the AC and DC DCT coefficients corresponding to macroblocks which are being decoded. According to the so-called "Main Profile" described in the MPEG standard, each macroblock is represented by 4 luminance and 2 chrominance blocks. In one exemplary embodiment, for each macroblock of a P or B frame being processed, the IDCT circuit 718 receives from the CBC circuit 718, a luminance DC DCT coefficient bias value (LBV) and a chrominance DC DCT coefficient bias value (CBV). The IDCT circuit adds the LBV to each one of the DC DCT coefficients included in the luminance blocks which represent the macroblock being processed. In addition, the IDCT circuit adds the CBV to each one of the DC DCT coefficients included in the chrominance blocks which represent the macroblock being processed. In this manner, the present invention effectively simulates the biasing effect associated with the use of motion vectors and MPEG's specified integer rounding technique.

The IDCT circuit 718 performs an inverse DCT operation on the DCT coefficients representing each block as is known in the art. In accordance with the present invention, the result of the IDCT operation is output to the downsampler 720 with the result's fractional component intact.

In the case of images being decoded through the use of motion compensation, the output of the downsampler 720 and the output of the select/average predictions circuit 728 are combined by the summer 722. The output of the summer 722 is supplied to the rounding circuit 730. The rounding circuit 730 is responsible for converting the values received from the switch 24 into integer values prior to storage in the reference frame store 34. The rounding circuit 730 may perform a non-biased rounding operation, e.g., 50% of the time it rounds values of X.5 up to the nearest integer value and 50% of the time it rounds values of X.5 down to X. If the rounding circuit is statistically biased, to a significant degree, the statistical bias generated by the rounding circuit should be subtracted in computing the LBV and CBV.

Figure 8:
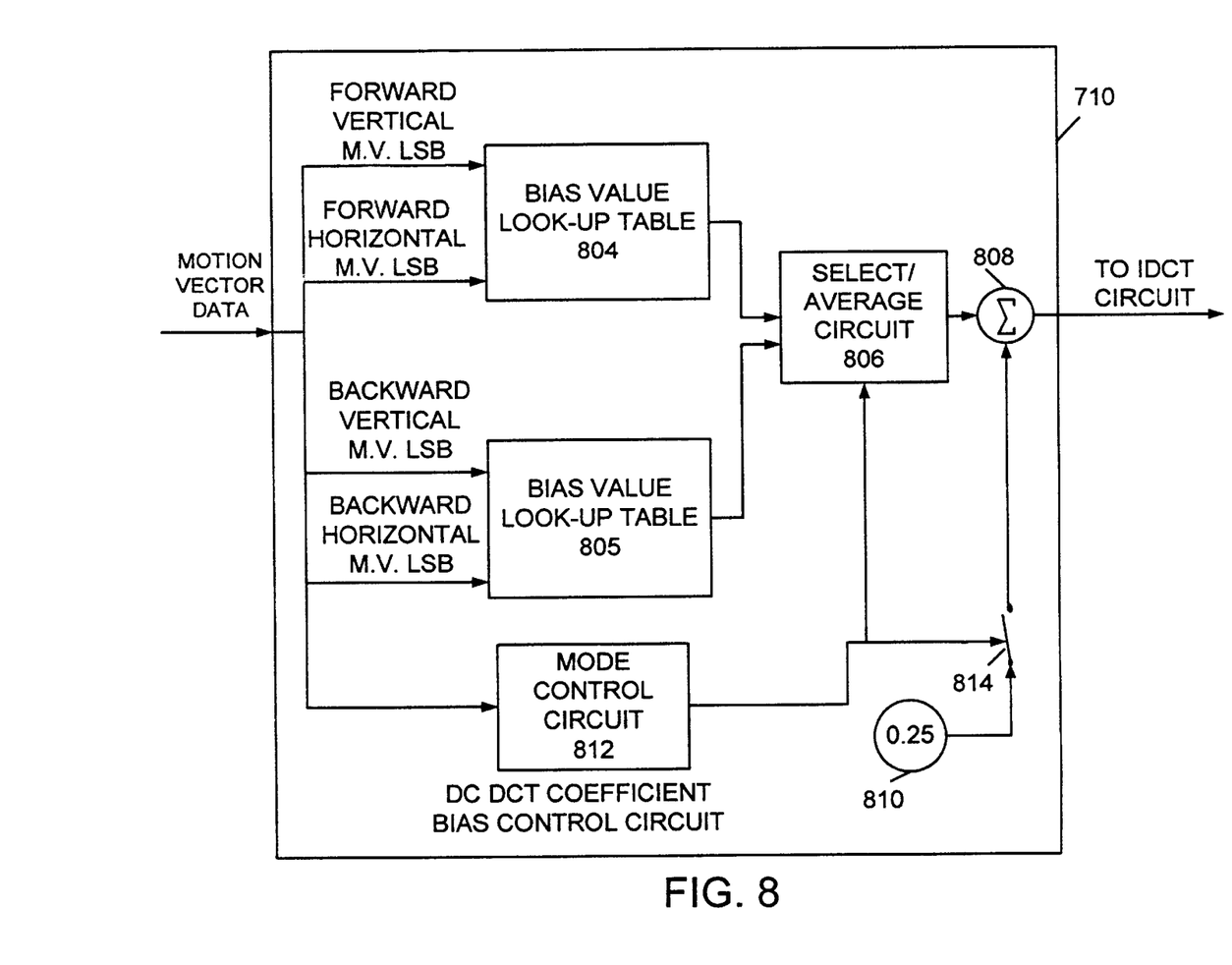
FIG. 8 illustrates an exemplary DC DCT coefficient bias control circuit suitable for use in the decoder of FIG. 7.

FIG. 8 is a detailed illustration of an exemplary embodiment of a CBC circuit 710. As illustrated in FIG. 8, the CBC circuit 710 comprises first and second bias value look-up tables 804, 805, a select/average circuit 806, a mode control circuit 812, summer 808, switch 814 and constant value circuit 810.

When decoding a block involves the use of motion vectors, the CBC circuit 710 receives as its inputs the motion vector offsets associated with the block being generated. In the case of a block being generated using either a forward or backward motion vector, the CBC circuit 710 will receive a single set of motion vector offsets. In the case of a bi-directionally coded block, the CBC circuit will receive a set of motion vector offsets corresponding to forward and backward motion vectors. Each received forward and backward motion vector includes a vertical and horizontal motion vector offset value. The configuration shown in FIG. 8 assumes that the motion vectors are represented with a single fractional bit, representing half-pixel offsets, as is specified by the MPEG standard.

Each of the bias value look-up tables 804, 805 may be implemented using tables which are the same as or similar to the table illustrated in FIG. 6. The first bias value look-up table 804 is used to generate a rounding bias value associated with the use of a forward motion vector. The second bias value look-up table 805 is used to generate a rounding bias value associated with the use of a backward motion vector.

It is possible to determine if a motion vector offset is specified 1) as an integer or 2) as an integer with a hal-pel offset, from the least significant bit (LSB) of the motion vector's offset values. For this reason, in the FIG. 8 embodiment, the first bias value look-up table 804 receives as its inputs the LSB of the forward motion vector's vertical and horizontal offsets. In addition, the second bias value look-up table 805 receives as its inputs the LSB of the backward motion vector's vertical and horizontal offsets.

When the first and second bias value look-up tables 804, 805 are supplied with motion vector offset input data they generate corresponding bias output values. As discussed above, in the case of P-frames a single motion vector is used. Accordingly, when P-frame data is being processed only one of the tables 804, 805 will output a value. B-frames allow the use of both forward and backward predictions. Accordingly, when B-frames are processed, both tables 804, 805 may output bias values. The bias value outputs of the first and second look-up tables 804, 805 are coupled to the input of the select/average circuit 806.

The mode control circuit 812 receives the motion vector signals as its inputs and detects whether forward, backward, or forward and backward motion vector data is being processed. In the case of receiving both forward and backward motion vector data the mode control circuit 812 controls the select/average circuit 806 to average the bias value output by the first and second look-up tables 804. The circuit 806 does not perform integer rounding and outputs values having fractional components. When forward and backward motion vectors are being processed, the mode control circuit 812 also controls switch 814 so that it will be in the closed position. When switch 814 is closed, the summer 808 adds the value 0.25 to the output of the select/average circuit 806. The added 0.25 value simulates the additional biasing that results from the averaging, and rounding performed in the case of bi-directional predictions by a select/average predictions circuit such as the circuit 28 of FIG. 1 that uses the MPEG rounding procedure.

The output of the summer 808 maintains fractional precision, and is supplied to the IDCT circuit as a LBV in this exemplary embodiment wherein luminance coefficient biasing is being described.

When only a forward or backward motion vector is being processed, the mode control circuit 812 detects forward or backward motion vector data. In response to detecting the receipt of forward or backward motion data but not both, the circuit 812 controls the switch 814 to be open. It also controls the select/average circuit 806 to select and output the value from one of the first or second bias value look-up tables 804, 805. If the mode control circuit 812 detects only forward motion vector data, the circuit 806 is controlled to select and output the value generated by the first look-up table 804. However, if the mode control circuit 812 detects only backward motion vector data, the circuit 806 is controlled to select and output the value generated by the second look-up table 805.

Since the switch 814 is in the open position when a single motion vector is being processed, the bias value selected by the circuit 806 will be output via the summer 808.

Figure 9:
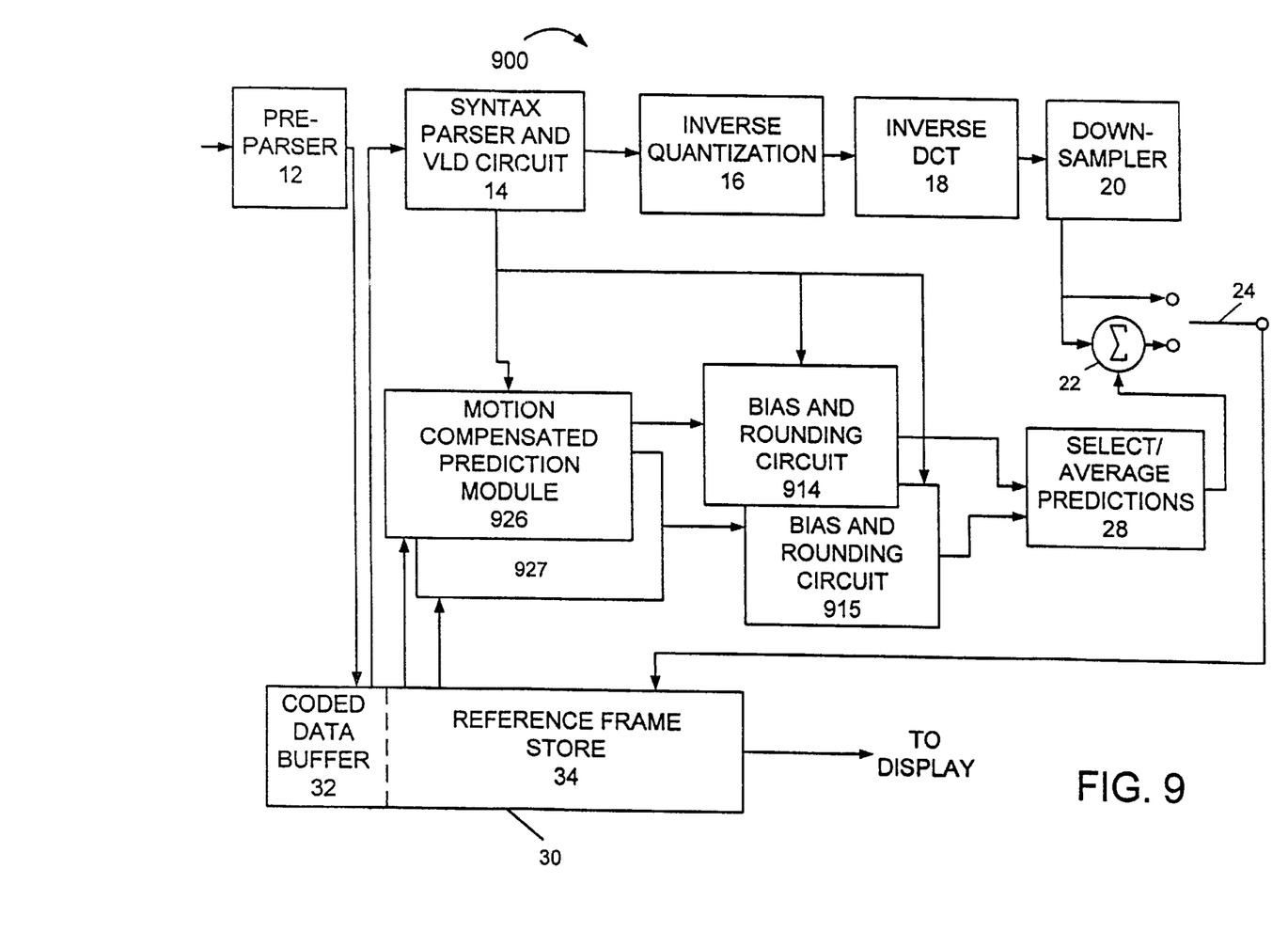
FIG. 9 illustrates a downsampling video decoder implemented in accordance with another embodiment of the present invention.

FIG. 9 illustrates a downsampling video decoder 900 implemented in accordance with another embodiment of the present invention. As illustrated the decoder 900 comprises an optional preparser 12, memory 30, syntax parser and VLD circuit 14, inverse quantization circuit 16, IDCT circuit 18, downsampler 20, summer 22, switch 24, and select/average predictions circuit 28 each of which is the same as or similar to the like numbered components of the known decoder 100. For the purposes of brevity, components of the decoder 900, which are the same as or similar to those of the known decoder 100, will not be described again in detail.

In addition to the above discussed elements, the decoder 900 includes first and second motion compensated prediction modules 926, 927, and first and second bias and rounding circuits 914, 915. The motion compensated prediction modules 926, 927 are similar in function to those of the known decoder 100. However, the motion compensated prediction modules 926, 927 do not round the pixel values they generate to integer values. Instead, the first and second MCP modules 926, 927 output, to the first and second bias and rounding circuit 914, 915, respectively, pixel values with fractional components.

In accordance with the present invention, the bias and rounding circuits 914, 915 are responsible for rounding the pixel values output by the motion compensated prediction modules 926, 927 to produce integer pixel values. The bias and rounding circuits 914, 915 use motion vector data, e.g., motion vector offsets, supplied by the syntax parser and VLD circuit 14 to determine the amount of biasing that should be added to the pixel values prior to rounding, to simulate the biasing effect associated with MPEG's specified integer rounding normally performed in the MCP modules.

The outputs of the first and second bias and rounding circuits 914, 915 are sets of pixel values generated using different motion vectors. The select/average predictions circuit 28 selects the output of the one of the circuits 914, 915 responsible for processing the received motion vector when only a forward or backward motion vector is used. When both forward and backward motion vectors are used in generating an image, the select/average predictions circuit averages the integer pixel values input thereto and rounds the resulting values to integer values in accordance with the MPEG specification. That is, the select/average predictions circuit 28 rounds values of X.5 to the integer value of X+1.

Through the use of the bias and rounding circuits 914, 915, and by using MCP modules 926, 927, which output pixel values including fractional components, the amount of average value drift introduced into frames generated by a downsampling decoder using motion compensated predictions can be reduced or eliminated.

Figure 10:
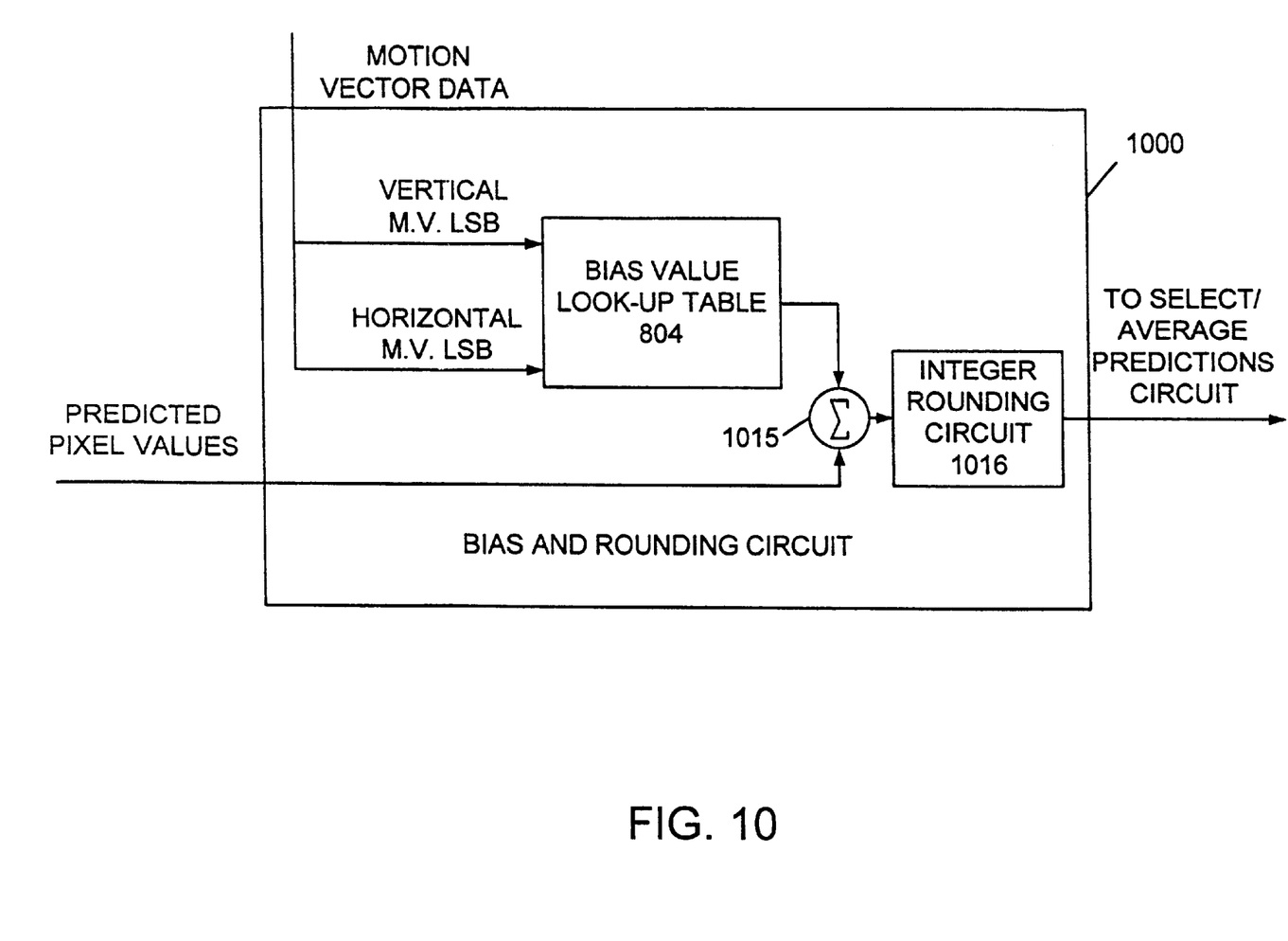
FIG. 10 illustrates an exemplary bias and rounding circuit suitable for use in the decoder of FIG. 9.

Referring now to FIG. 10, there is illustrated a bias and rounding circuit 1000 which may be used as the bias and rounding circuits 914, 915. The bias and rounding circuit 1000 includes a bias value look-up table 804, a summer 1015 and an integer rounding circuit 1016.

The bias value look-up table 804 receives as its inputs the least significant bits of the vertical and horizontal motion vector offsets used by the MCP module 926 or 927 to generate the pixel values being processed by the circuit 1000. The bias value output by the lookup table 804 is added by the summer 1015 to each of the pixel values in the block which was generated using the motion vector. The resulting pixel values with their fractional components are rounded to integer values by the integer rounding circuit 1016. The integer rounding circuit 1016 performs a non-biased rounding operation. The integer pixel values produced by the integer rounding circuit 1016 serve as the output of the bias and rounding circuit 1000.

FIGS. 9 and 10 have been described in terms of an embodiment which generates bias values for luminance blocks and luminance pixel values. It is to be understood that chrominance bias values are generated in the same manner and applied to chrominance pixel values once the appropriate MPEG scaling is applied to the luminance motion vector components to produce the chrominance motion vector components.

In order to reduce processing requirements, the application of the rounding bias simulation techniques of the present invention may be applied to some but not all frames generated using motion vectors. Because B-frames are not used as anchor frames, errors in B-frames do not affect subsequent frames. Errors in P-frames, on the other hand, have an impact on subsequent frames which use these frames as anchor frames. In various embodiments frame type information is used to determine when a bias value is to be generated in accordance with the present invention. In at least some of these embodiments, luminance and chrominance bias values are generated for P-frames but not for B-frames.

It is to be understood that the video decoder and various methods described herein may be implemented as software implemented on a general purpose computer such as a personal computer which includes CPU, memory and a display device.

The methods and apparatus of the present invention may be used to implement, e.g., television sets for decoding both standard and high definition video signals as well as a host of other device.

What is claimed is:

1. A method of processing video data including motion vectors and image data, the image data including DCT coefficients, the method comprising the steps of:
   generating a biasing value as a function of a motion vector value; and
   modifying the value of at least one of said DCT coefficients as a function of the generated biasing value.

2. The method of claim 1,
   wherein the motion vector value is a motion vector offset; and
   wherein the step of modifying the value of at least one of the DCT coefficients includes the step of adding the generated biasing value to said one of the DCT coefficients.

3. The method of claim 2,
   wherein the offset is a luminance motion vector offset, wherein the generated biasing value is a luminance biasing value, and wherein the DCT coefficient to which the biasing value is added is luminance image data.

4. A method of processing data including motion vectors and non-integer pixel values, the method comprising the steps of:
   generating a biasing value as a function of a motion vector value;
   adding said biasing value to at least one of said non-integer pixel values to generate a second non-integer pixel value; and
   performing a non-biased rounding operation on the second non-integer pixel value to produce, an integer pixel value therefrom.

5. A method of processing video data including motion vectors and image data, comprising the steps of:
   generating a biasing value as a function of a motion vector value; and
   modifying the value of at least some of the image data as a function of the generated biasing value;
   wherein the video data being processed includes P and B frame video data, and the method further includes the step of:
   processing B frame data without performing the steps of generating a biasing value and without modifying B frame data as a function of a generated biasing value.

6. The method of claim 2,
   wherein the offset is a luminance motion vector offset;
   wherein the step of generating a biasing value includes the step of performing a scaling operation on the luminance motion vector offset; and
   wherein the generated biasing value is a chrominance biasing value, and the DCT coefficient to which the biasing value is added is chrominance image data.

7. The method of claim 4,
   wherein said at least one of said non-integer pixel values is a value corresponding to a chrominance block.

8. The method of claim 6, wherein the video data being processed includes P and B frame video data, the method including the step of:
   processing B frame data without performing the steps of generating a biasing value and without modifying B frame data as a function of a generated biasing value.

9. The method of claim 1, wherein the image data includes AC and DC DCT coefficients, the method further comprising the step of:
   adding biasing values to a plurality of the DC DCT coefficients.

10. The method of claim 9, further comprising the steps of:
    performing an inverse discrete cosine transform operation using the AC DCT coefficients and the modified DC DCT coefficients to produce a first set of pixel values;
    performing a motion compensated prediction operation using the motion vector value and reference frame data to produce a second set of pixel data; and
    combining the first and second set of pixel data to form a third set of pixel data.

11. The method of claim 10, further comprising the step of:
    downsampling the first set of pixel values prior to performing the combining step.

12. The method of claim 1, wherein the step of generating a biasing value includes the step of:
    examining a first set of motion vector offsets to determine if the offsets include non-integer values; and
    generating the biasing value as a function of the number of non-integer motion vector offsets included in the first set of motion vector offsets.

13. The method of claim 12, wherein the step of generating a biasing value further includes the step of:
    examining a second set of motion vector offsets to determine if the second set of offsets includes non-integer offset values; and
    wherein the step of generating the biasing value is further performed as a function of the number of non-integer motion vector offsets included in the second set of motion vector offsets.

14. The method of claim 13, wherein the step of generating the biasing value includes the step of:
    utilizing non-integer offset value information obtained by examining the first set of motion vector offsets to access a look-up table to obtain a first bias value;

utilizing non-integer offset value information obtained by examining the second set of motion vector offsets to access a look-up table to obtain a second bias value;

averaging the first and second bias values to obtain and average bias value; and adding 0.25 to the average bias value to generate the biasing value.

15. The method of claim 4, further comprising:

generating biasing values for additional non-integer pixel values; and adding each of the generated biasing values to at least one of the additional non-integer pixel values.

16. A method of processing a plurality of pixel values, comprising the steps of:

receiving motion vector data;

generating a pixel bias value as a function of the received motion vector data, the pixel bias value being determined from at least one motion vector value;

adding said pixel bias value to several of the plurality of pixel values to generate a set of biased pixel values including at least one non-integer pixel value; and performing a rounding operation on said at least one non-integer pixel value.

17. The method of claim 16, wherein the step of generating the pixel bias value comprises the step of:

using motion vector offsets to generate the bias value.

18. The method of claim 17, wherein said rounding operation is a non-biased rounding operation.

19. An image data processing apparatus, comprising:

first horizontal and vertical motion vector offset data inputs;

means for generating a first DCT coefficient bias value, the first DCT coefficient bias value being one of a plurality of preselected output values depending on whether horizontal and vertical motion vector offset data received via said inputs represents integer, non-integer or a combination of integer and non-integer values; and a first output for outputting the first generated DCT coefficient bias value.

20. An image data processing apparatus, comprising:

first horizontal and vertical motion vector offset data inputs;

means for generating a first bias value, the first bias value being one of a plurality of preselected output values depending on whether horizontal and vertical motion vector offset data received via said inputs represents integer, non-integer or a combination of integer and non-integer values;

a first output for outputting the first generated bias value;

second horizontal and vertical motion vector offset data inputs;

means for generating a second bias value, the second bias value being one of a plurality of preselected output values depending on whether horizontal and vertical motion vector offset data received via said second inputs represents integer, non-integer or a combination of integer and non-integer values; and a second output for outputting the second generated bias value.

21. The apparatus of claim 20, further comprising:

an averaging circuit for receiving the first and second generated bias values from the first and second outputs and for coupled to the outputs of the first and second outputs and for generating an average bias value therefrom.

22. The apparatus of claim 21, further comprising:

a summer for adding a value of 0.25 to the average bias value to generate a DC DCT coefficient bias value therefrom.

23. The apparatus of claim 22, further comprising;

an adder for adding the DC DCT coefficient bias value to a plurality of DC DCT coefficients to generate a biased set of DC DCT coefficients;

means for performing an IDCT operation using the biased set of DC DCT coefficients; and an integer rounding circuit coupled to the IDCT circuit.

24. A decoder, comprising:

a syntax parser and variable length decoder circuit;

a first motion compensated prediction module coupled to the syntax parser and variable length decoder circuit for generating a first set of pixel values; and a first pixel value bias and non-biased rounding circuit coupled to the first motion compensated prediction module.

25. A decoder, comprising:

a syntax parser and variable length decoder circuit;

a first motion compensated prediction module coupled to the syntax parser and variable length decoder circuit for generating a first set of pixel values;

a first pixel value bias and non-biased rounding circuit coupled to the first motion compensated prediction module;

a second motion compensated prediction module coupled to the syntax parser and variable length decoder circuit for generating a second set of pixel values;

a second pixel value bias and rounding circuit coupled to the second motion compensated prediction module; and an averaging circuit for averaging pixel values output by the first and second pixel value bias and rounding circuits.

* * * * *